United States Patent
Chiu et al.

(10) Patent No.: US 7,589,807 B2
(45) Date of Patent: Sep. 15, 2009

(54) METHOD FOR FORMING A LIQUID CRYSTAL DISPLAY WITH PARTICULAR METAL LAYER

(75) Inventors: Chun-Chang Chiu, Taoyuan County (TW); Wen-Yi Syu, Taoyuan County (TW); Kuan-Yi Lee, Taoyuan County (TW)

(73) Assignee: Au Optronics Corp., Hsinchu (TW)

( * ) Notice: Subject to any disclaimer, the term of this patent is extended or adjusted under 35 U.S.C. 154(b) by 567 days.

(21) Appl. No.: 11/427,036

(22) Filed: Jun. 28, 2006

(65) Prior Publication Data

US 2007/0002196 A1    Jan. 4, 2007

(30) Foreign Application Priority Data

Jun. 29, 2005    (TW) .............................. 94121852 A (51) Int. Cl.
G02F 1/1335    (2006.01)
G02F 1/136    (2006.01)

(52) U.S. Cl. ........................................ 349/114; 349/43

(58) Field of Classification Search ................ 349/114, 349/43
See application file for complete search history.

(56) References Cited

U.S. PATENT DOCUMENTS

| | | | |
|---|---|---|---|
| 6,680,765 B1 * | 1/2004 | Maeda et al. | 349/117 |
| 6,808,868 B2 * | 10/2004 | Fujibayashi et al. | 430/321 |
| 6,870,585 B2 * | 3/2005 | Chen et al. | 349/106 |
| 6,873,383 B1 | 3/2005 | Maeda et al. | |
| 7,133,094 B2 * | 11/2006 | Ogawa et al. | 349/114 |
| 2003/0117552 A1 | 6/2003 | Chae | |
| 2005/0094067 A1 | 5/2005 | Sakamoto et al. | |

FOREIGN PATENT DOCUMENTS

| | | |
|---|---|---|
| CN | 1263608 | 8/2000 |
| CN | 1542528 | 11/2004 |
| EP | 0973058 A1 | 1/2000 |
| EP | 1550902 A2 | 7/2005 |
| EP | 1550903 A2 | 7/2005 |
| EP | 0973058 B1 | 12/2005 |
| EP | 1550902 A3 | 3/2006 |
| EP | 1550903 A3 | 3/2006 |

OTHER PUBLICATIONS

China Office Action mailed Aug. 3, 2007.

* cited by examiner

*Primary Examiner*—Mike Qi
(74) *Attorney, Agent, or Firm*—Thomas, Kayden, Horstemeyer & Risley (57) ABSTRACT

A method for forming a liquid crystal display is disclosed. A substrate comprising a thin film transistor area and a pixel area is provided. A gate line, a gate dielectric layer, an active layer and a doped layer are formed overlying the substrate sequentially. A metal layer is formed overlying the doped layer. The metal layer, doped layer and the active layer in the thin film transistor area are defined to form a thin film transistor. The metal layer in the pixel area is defined to form a first metal portion of a first thickness and a second metal portion of a second portion, wherein the first metal portion acts as a contact region, the first thickness exceeds the second thickness, and the second thickness is sufficient to partially reflect and partially transmit incident light to form a transflective region in the pixel area.

19 Claims, 13 Drawing Sheets

METHOD FOR FORMING A LIQUID CRYSTAL DISPLAY WITH PARTICULAR METAL LAYER

BACKGROUND

The invention relates to a method for forming a liquid crystal display, and in particular to a method for forming a reflective liquid crystal display.

Liquid crystal display (LCD) devices, widely used in devices such as portable televisions and notebook computers, are classified into transmission types using a backlight as a light source, and reflective types using an external light source, such as sunlight or indoor lamp. It is difficult to decrease the weight, volume, and power consumption of transmission types due to the power requirements of the backlight component. While reflective types have the advantage of not requiring a backlight component, but they cannot operate without an external light source.

In order to overcome the drawbacks of these two types of LCDs, a transflective LCD device which can operate as both a reflective and transmission type LCD is disclosed. The transflective LCD device has a reflective electrode in a pixel region, having a transmissive portion. Thus, the transflective LCD device has lower power consumption than the conventional transmission type LCD device since no backlight component is required in the presence of bright external light. Further, in comparison with the reflective type LCD device, the transflective LCD device has the advantage of operating as a transmission type LCD device using a backlight when no external light is available.

Figure 1:
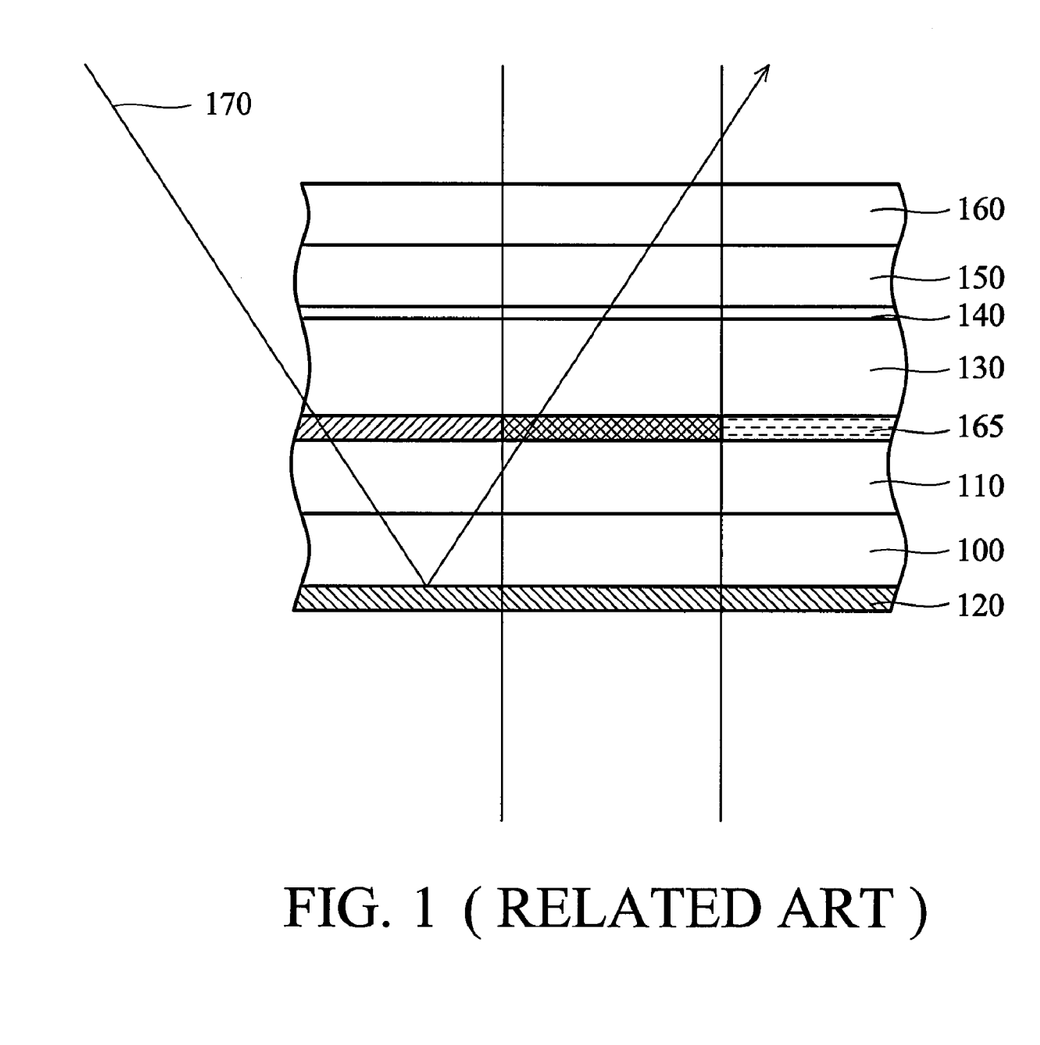
FIG. 1 is a plan view of a conventional transflective LCD.

FIG. 1 is a plan view of a conventional transflective LCD. In a conventional transflective LCD, an isolation layer 110 is disposed on a bottom substrate 100, and a pixel area 165 overlies the isolation layer 110. A top substrate 160 is opposite the bottom substrate 100. A color filter 150 is disposed on the inner side of the top substrate 160. A common electrode 140 is disposed on the color filter 150. A liquid crystal layer 130 is interposed between the bottom substrate 100 and the top substrate 160. A reflective layer 120 is disposed on outer side of the bottom substrate 100, one portion of which reflects ambient light and another passes source light of a LCD device.

During operation, however, due to refraction, reflective light and incident light 170 may not pass through the same pixel 165, thus generating aberration problem. One solution is to form the reflective electrode on the inner side of the bottom electrode. This technology, however, requires at least six lithography steps, increasing complexity and cost.

SUMMARY

An embodiment of the invention provides a method for forming a liquid crystal display. A substrate comprising a thin film transistor area and a pixel area is provided. A gate line, a gate dielectric layer, an active layer and a doped layer are formed overlying the substrate sequentially. A metal layer is formed overlying the doped layer. The metal layer, doped layer and the active area in the thin film transistor area are defined to form a thin film transistor. The metal layer in the pixel area is defined to form a first metal portion with a first thickness and a second metal portion with a second thickness, wherein the first metal portion acts as a contact region, the first thickness exceeds than the second thickness, and the second thickness is sufficient to partially reflect and partially transmit incident light to form a transflective region in the pixel area.

Another embodiment of the invention provides a method for forming a liquid crystal display. A substrate comprising a thin film transistor area and a pixel area is provided. A gate line, a gate dielectric layer, an active layer and a doped layer are formed overlying the substrate. A metal layer is formed overlying the doped layer. The metal layer, the doped layer and the active layer are defined in the thin film transistor area to form a thin film transistor. The metal layer, the doped layer and the active layer are defined in the pixel area to form a first metal portion, a second metal portion and a transmissive region exposing the gate dielectric layer, wherein the first metal portion acts as a contact region, and the second metal portion is sufficient to reflect incident light to form a reflective region.

Further another embodiment of the invention provides a method for forming a liquid crystal display. A substrate comprising a thin film transistor area and a pixel area is provided. A gate line, a gate dielectric layer, an active layer and a doped layer are formed overlying the substrate sequentially. A metal layer is formed overlying the doped layer. The metal layer, doped layer and the active layer are defined in the thin film transistor area to form a thin film transistor. The metal layer in the pixel area is defined to form a metal portion, wherein the metal portion is sufficient to reflect incident light to form a reflective region.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description discloses the best-contemplated mode of carrying out the invention. This description is made for the purpose of illustrating the general principles of the invention and should not be taken in a limiting sense. The scope of the invention is best determined by reference to the appended claims.

In this specification, expressions such as "overlying the substrate", "above the layer", or "on the film" simply denote a relative positional relationship with respect to the surface of the base layer, regardless of the existence of intermediate layers. Accordingly, these expressions may indicate not only the direct contact of layers, but also, a non-contact state of one or more laminated layers.

FIGS. 2A~2H illustrate process steps for forming a transflective liquid crystal display of an embodiment of the invention, wherein light transmittance of a metal layer correlates with a thickness of the metal layer therein. The metal layer can act as a reflective layer when a thickness is thick enough, for example about 1000 Å~9000 Å. The metal layer acts as a transflective layer when the thickness is thin, for example about 100 Å~900 Å. In an embodiment of the invention, formation of a reflective layer, a transmissive layer and a transflective layer depends on adjusting thickness of the metal layer.

Figure 2A:
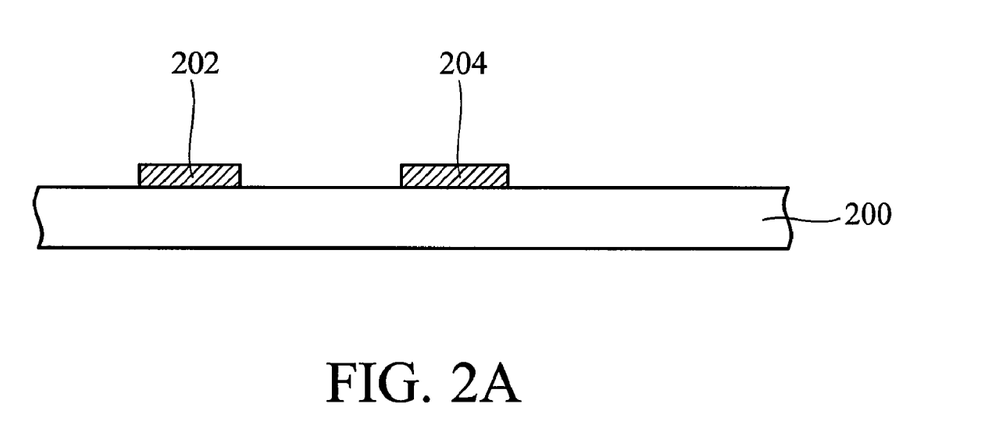
FIG. 2A~FIG. 2H illustrate process steps for forming a transflective liquid crystal display of an embodiment of the invention.

Referring to FIG. 2A, a substrate 200, such a glass substrate, a low alkali glass substrate or a non-alkali glass substrate, is provided. Next, a first metal layer (not shown) is formed on the substrate 200 by deposition, such as chemical vapor deposition CVD or plasma vapor deposition PVD. The first metal layer can be a single layer, for example comprising Al, Mo or a alloy AlNd, or multiple layers, such as Ti/Al, TiN/Al, Mo/Al or Ti/AlNd. Preferably, the first metal layer is a stacked layer of Ti/Al/TiN.

Figure 2B:
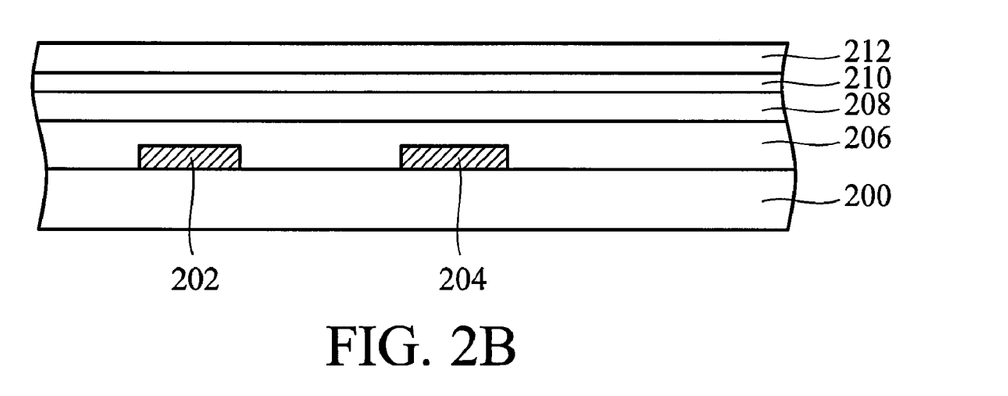

The first metal layer is patterned by conventional lithography and etching to form a gate line 202 and a storage capacitor 204 on the substrate 200. As shown in FIG. 2B, a gate dielectric layer 206, an active layer 208, a doped layer 210 and a second metal layer 212 are formed on substrate 200, the gate line 202 and the storage capacitor 204 in sequence by deposition, such as low pressure chemical vapor deposition LPCVD, plasma enhanced chemical vapor deposition PECVD or atomic layer deposition ALD. The invention, however, is not limited thereto.

The gate dielectric layer 206 can be silicon oxide, silicon nitride, silicon oxynitride, the combination thereof, or a stacked layer thereof. The active layer 208 can comprise semiconductor, such as silicon or germanium, and preferably polysilicon doped with hydrogen ions. The doped layer 210 can be a doped semiconductor, such as an n-type polysilicon doped with phosphorous or a n-type polysilicon doped with arsenic to reduce contact resistance between the second metal layer 212 and the active layer 208. The second metal layer 212 can be a monolayer, for example comprising Al, Mo, or a alloy, such as AlNd, or multiple layers, such as Ti/Al, TiN/Al, Mo/Al or Ti/AlNd. Preferably, the second metal layer 212 is a stacked layer of Ti/Al.

Figure 2C:
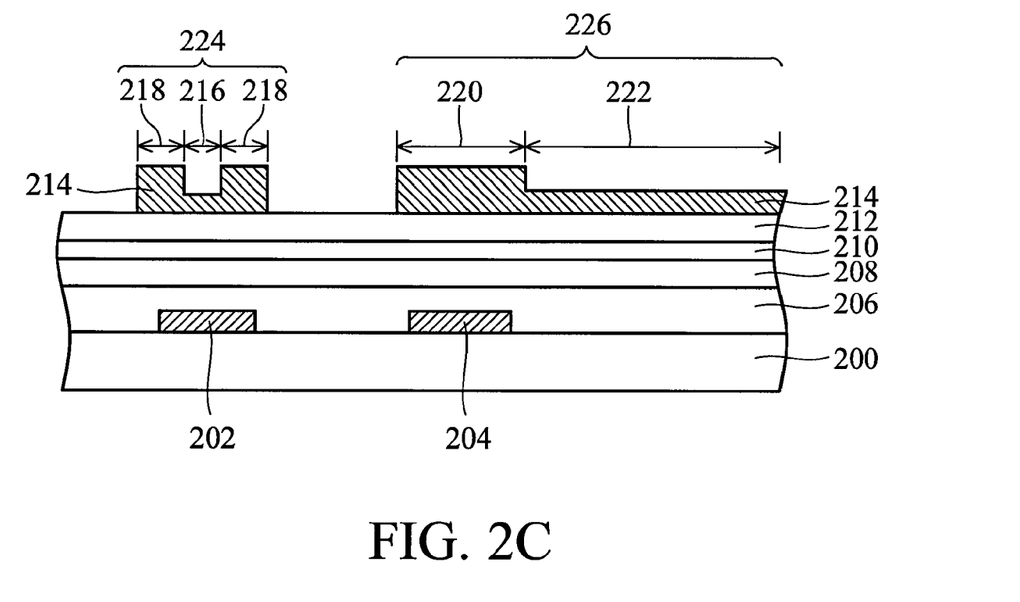

Next, as shown in FIG. 2C, a photoresist layer is coated on the second metal layer 212, then exposed by halftone process to form a first resist layer 214 having different thicknesses overlying the second metal layer 212 subsequent to developing step. In the embodiment of the invention, a liquid crystal device comprises a thin film transistor area 224, comprising a first region 216 and a second region 218, and a pixel area 226, comprising a third region 220 and a fourth region 222. The first region of the thin film transistor area 224 can be a channel region 216, the second region can be a source/drain region 218, the third region 220 can be a contact region, and the fourth region 222 can be a reflective region.

As shown in FIG. 2C, in the embodiment of the invention, the first resist layer 214 has different thicknesses overlying the thin film transistor area 224. For example, one portion of the first resist layer 214 overlying the channel region 216 is thinner than another portion of the first resist layer 214 overlying the source/drain region 218. Additionally, the first resist layer also has different thicknesses overlying the pixel area, for example, one portion of the first resist layer 214 overlying the contact region 220 is thicker than another portion of the first resist layer 214 overlying the reflective region 222. Preferably, the portion of the first resist layer 214 overlying the channel region 216 is thinner than the portion of the first resist layer 214 overlying the reflective region 222. In an example of the invention, the initially coated photoresist layer is about 15000 Å thick, the portion of the first resist layer 214 overlying the channel region 216 is about 4000 Å, and the portion of the first resist layer 214 overlying the reflective region 222 is about 7000 Å.

The halftone process can be accomplished by photo mask manufacturing technology, forming additional patterns overlying the channel region 216 and reflective region 222, reducing exposure energy to create the first resist layer 214 with different thicknesses subsequent to developing step.

Figure 2D:
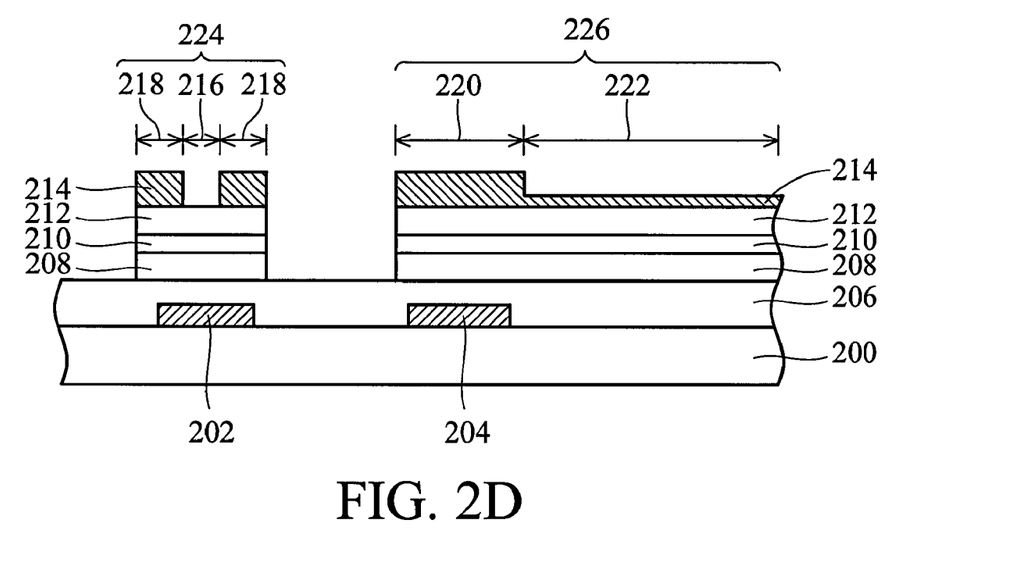

As shown in FIG. 2D, the second metal layer 212, the doped layer 210 and the active layer 208 are etched respectively using the first resist layer 214 as a mask until the gate dielectric layer 206 uncovered by the first resist layer 214 is revealed. In an embodiment of the invention, the first resist layer 214 overlying the channel region 216 has a thickness formed by controlling the halftone process and the etching process so as to be removed when the abovementioned layers are etched. Another portion of the first resist layer 214, specifically the portion overlying the reflective region 222, remains. In another embodiment of the invention, a portion of the first resist layer 214 overlying the channel region 216 is further removed by plasma etching, using O3, subsequent to etching of layers 212, 210 and 208.

Figure 2E:
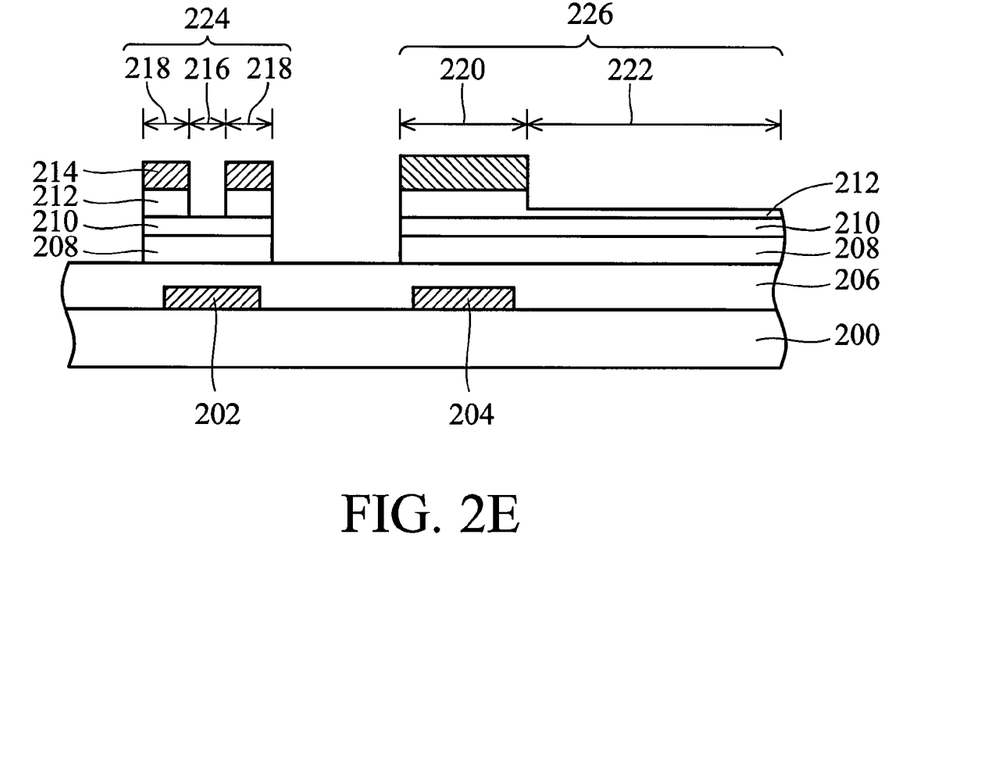

Next, as shown in FIG. 2E, the second metal layer 212 is etched using the first resist layer 214 as a mask to remove a portion overlying the channel region 216 while another portion of the second metal layer 212 overlying the reflective region 222 is partly etched. Consequently, the second metal layer 212 overlying the channel region 216 can be completely removed, and the portion of the second metal layer 212 remains a predetermined thickness overlying the reflective region 222 to act as a transflective layer. For example, a TiN layer with a thickness less than about 50 Å has a transmittance less than about 50% and a reflectance of about 20%, and a Ti layer presents a transmittance of about 40%, and a reflectance exceeding about 40%.

The second metal layer 212 can be a dual layer or multiple layers. For example, when the second metal layer 212 is a stacked layer of Al/TiN, the Al layer overlying the channel region 216 can be removed by wet etching, such as immersion in HCl. The TiN layer overlying the channel region 216 remains, and the second metal layer 212 overlying the reflective region 222 is not etched. Next, the TIN layer overlying the channel region 216 is removed by dry etching, such as reactive ion etching RIE, and the first resist layer 214 overlying the reflective region 222 is removed simultaneously. The remaining Al layer overlying the reflective region 222 can be removed by wet etching. Accordingly, a portion of the second metal layer 212 overlying the channel region 216 is completely removed, and another portion (TiN layer) overlying the reflective region 222 remains.

Figure 2F:
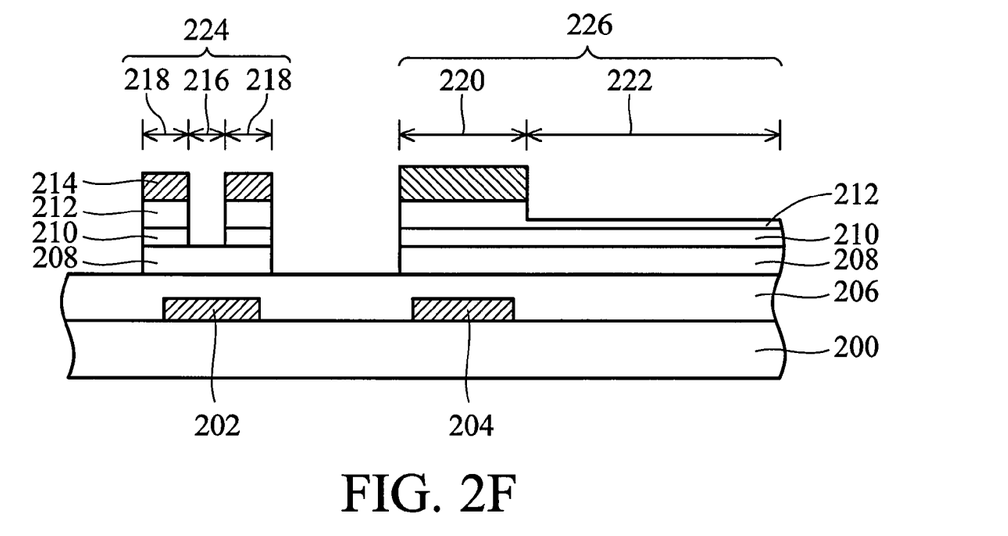
Figure 2G:
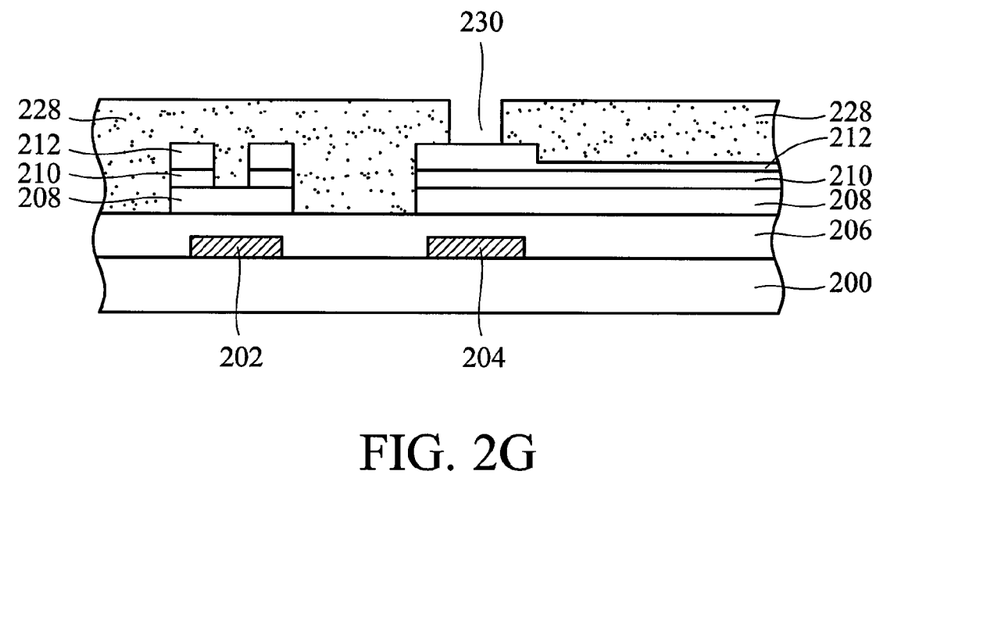
Figure 2H:
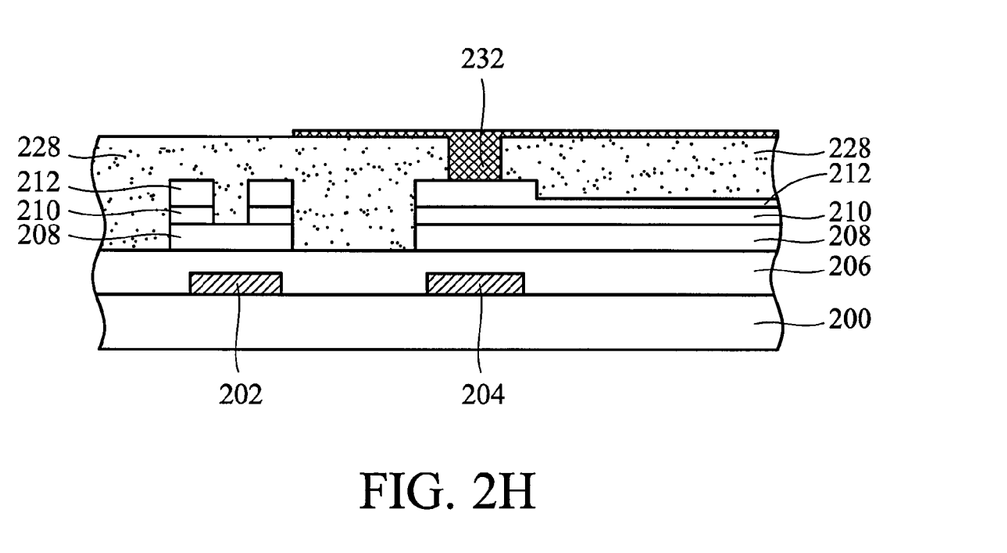

As shown in FIG. 2F, the doped layer 210 is etched using the first resist layer 214 and the second metal layer 212 as a mask to remove a portion of the doped layer 210 overlying the channel region 216, forming contact structure on the source/drain region 218 of the active layer 208. The first resist layer 214 is then removed. Next, as shown in FIG. 2G, a protective layer 228 is formed by deposition, such as chemical vapor deposition CVD or plasma enhanced chemical vapor deposition PECVD, to cover the gate dielectric layer 206, the etched second metal layer 212 and the active layer 208 described. The protective layer 228 is patterned by conventional lithography and etching to form an opening 230 overlying the contact region. As shown in FIG. 2H, the pixel electrode layer (not shown), such as ITO, is formed on the protective layer 228, and fills the opening 230 to serve as a contact. The pixel electrode layer is patterned by conventional lithography and etching to act as a pixel electrode 232 of a liquid crystal display.

According the method for forming a liquid crystal display, lithography step is required only when defining the first metal layer, the first resist layer, the protective layer and the pixel electrode. Consequently, due to requirement of only four lithography steps, costs are reduced and process steps simpled. In addition, thickness of the second metal layer overlying the reflective region can be fine tuned to provide a reflective layer of a transflective liquid crystal display. For example, the second metal layer can be a stacked layer comprising a Ti layer of about 50~200 Å thick or a TiN layer of about 50~200 Å thick.

Figure 3A:
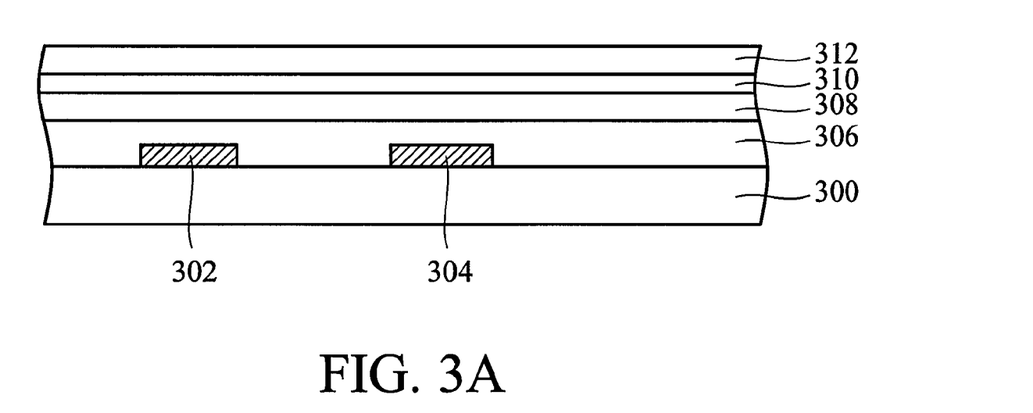
FIG. 3A~FIG. 3F illustrate process steps for forming a transflective liquid crystal display of another embodiment of the invention FIG. 4A~

FIGS. 3A~3F illustrate process for forming a transflective liquid crystal display of another embodiment of the invention, wherein similar parts to the embodiment described is not described in detail for simplicity. Referring to FIG. 3A, a substrate 300, such as a glass substrate, a low alkali glass substrate and a non-alkali glass substrate, is provided. Next, a first metal layer (not shown) is formed on the substrate 300 by deposition, such as chemical vapor deposition CVD or plasma vapor deposition PVD. The first metal layer can be a single layer, for example comprising Al, Mo, or alloy, such as AlNd, or multi layer, such as Ti/Al, TiN/Al, Mo/Al or Ti/AlNd. Preferably, the first metal layer is a stacked layer of Ti/Al/TiN.

The first metal layer is patterned by conventional lithography and etching to form a gate line 302 and a storage capacitor 304 on the substrate 300. Next, a gate dielectric layer 306, an active layer 308, a doped layer 310 and a second metal layer 312 are formed on the substrate 300, the gate line 302 and the storage capacitor 304 in sequence by deposition, such as low pressure chemical vapor deposition LPCVD, plasma enhanced chemical vapor deposition PECVD or atomic layer deposition ALD. The invention, however, is not limited thereto.

The gate dielectric layer 306 can be silicon oxide, silicon nitride, silicon oxynitride, the combination thereof, or the stacked layer thereof. The active layer 308 can comprise semiconductor, such as silicon or germanium, and preferably comprises polysilicon doped with hydrogen ions. The doped layer 310 can be a doped semiconductor, such as an n-type polysilicon doped with phosphorous or an n-type polysilicon doped with arsenic to reduce contact resistance of the second metal layer 312 and the active layer 308. The second metal layer 312 can be a monolayer, for example comprising Al, Mo, or alloy, such as AlNd, or multiple layers, such as Ti/Al, TiN/Al, Mo/Al or Ti/AlNd. Preferably, the second metal layer 312 is a stacked layer of Ti/Al.

Figure 3B:
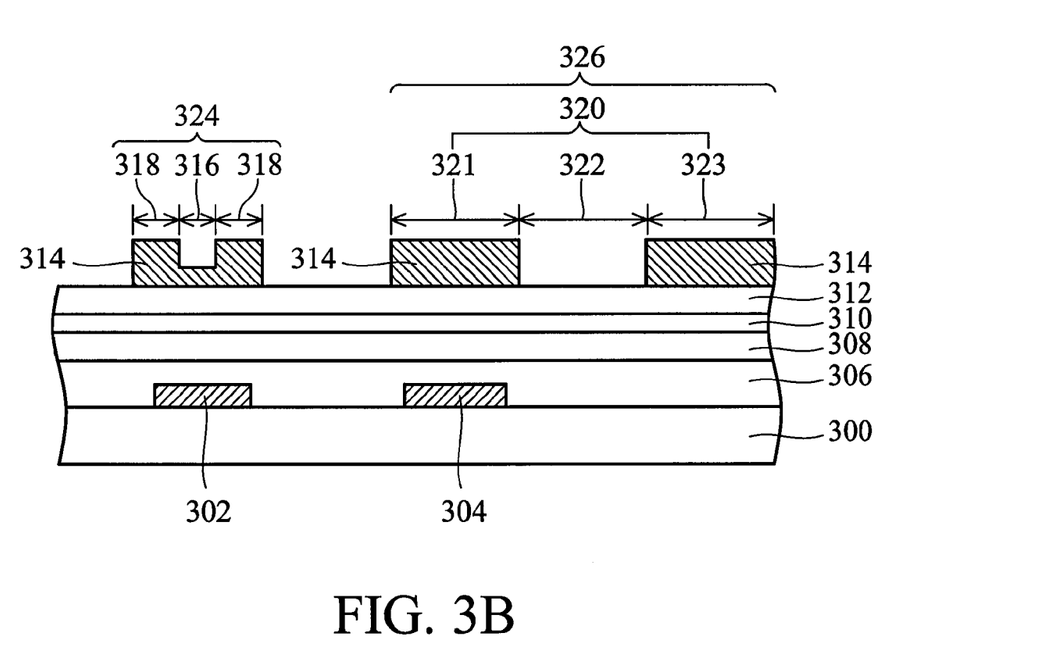

Next, as shown in FIG. 3B, a photoresist layer is coated on the second metal layer 312 and exposed by halftone process to form the first resist layer 314 having different thicknesses overlying the second metal layer 312 subsequent to developing. In the embodiment of the invention, a liquid crystal device comprises a thin film transistor area 324, comprising a first region 316 and a second region 318, and a pixel area 326, comprising a third region 320 and a fourth region 322. The first region 316 of the thin film transistor area 324 can be a channel region, the second region 318 can be a source/drain region, the third region 320 of the pixel area 326 includes a contact region 321 and a reflective region 323, and the fourth region 322 can be a transmissive region.

In the embodiment of the invention, the first resist layer 314 has portions of different thicknesses overlying the thin film transistor area 324. For example, one portion of the first resist layer 314 overlying the channel region 316 is thinner than another portion of the first resist layer 314 overlying the source/drain region 318. Additionally, a portion of the pixel area 326 is covered with the first resist layer 314. For example, the contact region 321 and the reflective region 323 are covered with the first resist layer 314, and the transmissive region 322 is not covered with the first resist layer 314. Preferably, a portion of the first resist layer 314 overlying the contact region 321 and another portion overlying the reflective region 323 substantially have the same thickness. More preferably, the first resist layer 314 overlying the contact region 321 and the reflective region 323 substantially has the same thickness as that of the portion of first resist layer 314 overlying the source/drain region 318. In an exemplary example of the invention, the thickness of the first resist layer 314 overlying the contact region 321 and the reflective region 323 is about 15000 Å, and the thickness of the resist layer 314 overlying the channel region 316 is about 4000 Å.

Figure 3C:
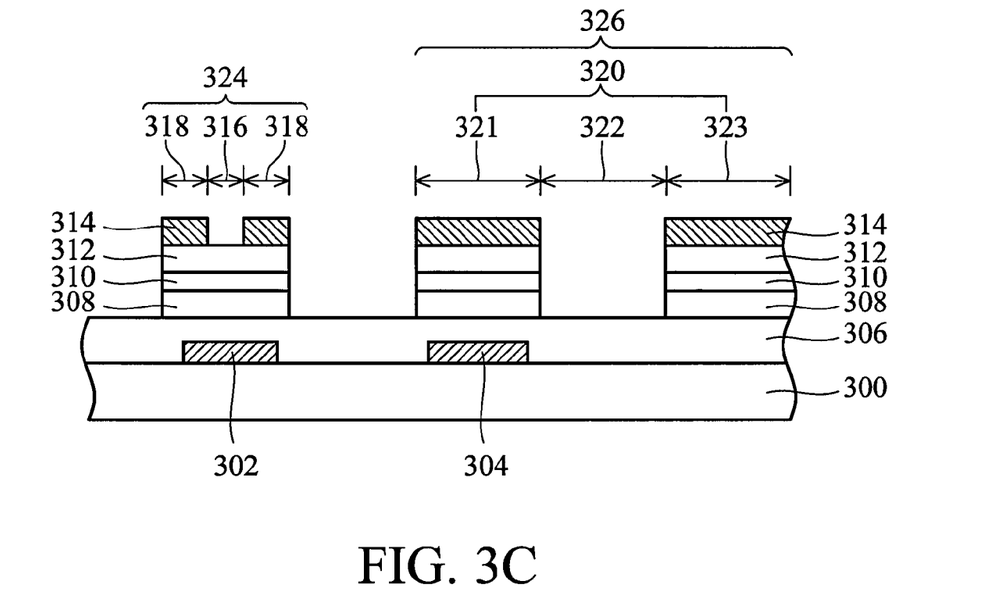

Next, as shown in FIG. 3C, the second metal layer 312, the doped layer 310 and the active layer 308 are etched respectively using the first resist layer 314 as a mask until the gate dielectric layer 306 uncovered by the first resist layer 314 is revealed. In an embodiment of the invention, the first resist layer 314 overlying the channel region 316 has a thickness formed by controlling the halftone process and the etching process so as to be removed when the abovementioned layers are etched. In another embodiment of the invention, the first resist layer 314 overlying the channel region 316 is further removed by plasma etching, such as plasma etching comprising O3, subsequent to etching of layers of 312, 310 and 308.

Figure 3D:
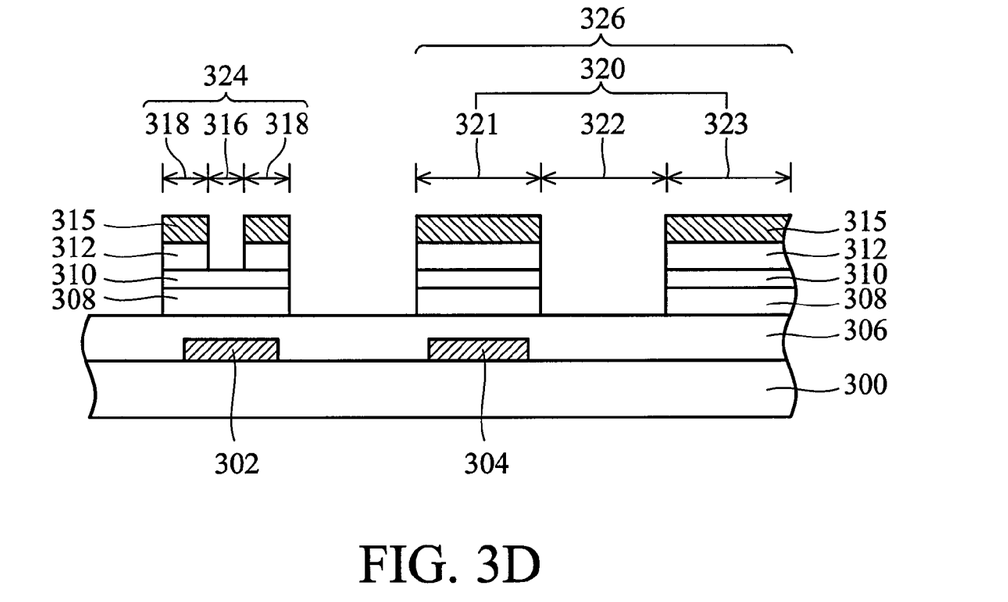
Figure 3E:
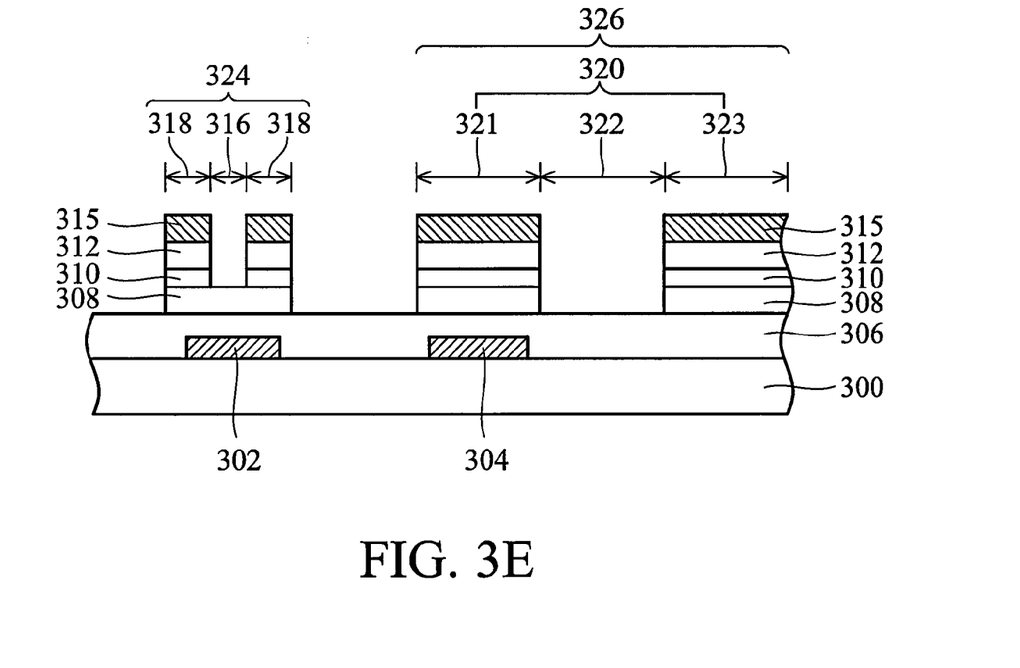
Figure 3F:
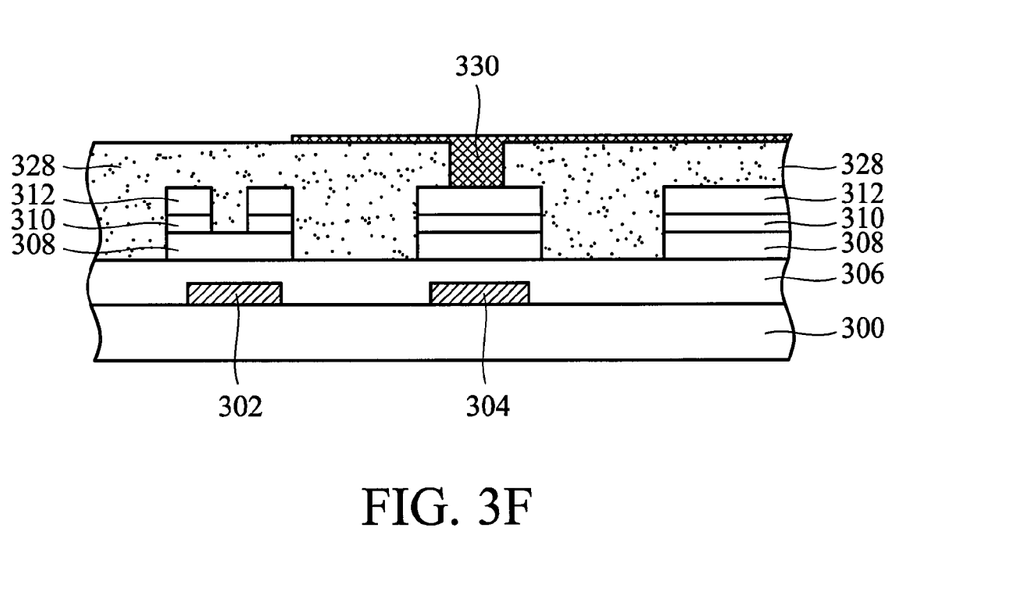

Referring to FIG. 3D, the second metal layer overlying the channel region 316 is etched by using the first resist layer 314 as a mask. Next, as shown in FIG. 3E, the doped layer 310 overlying the channel region 316 is further etched by using the first resist layer 314 as a mask. The first resist layer 314 is then removed. As shown in FIG. 3F, a protective layer 328, such as a TiN layer, is formed by deposition, such as chemical vapor deposition CVD or plasma enhanced chemical vapor deposition PECVD, to cover the gate dielectric layer 306, the etched second metal layer 312 and the active layer 308 described. The protective layer 328 is patterned by conventional lithography and etching to form an opening overlying the contact region. As shown in FIG. 3F, the pixel electrode layer, such as ITO, is formed on the protective layer, and fills the opening to serve as a contact. The pixel electrode layer is patterned by conventional lithography and etching to act as a pixel electrode 330 of a liquid crystal display.

According to the method for forming a liquid crystal display of the embodiment of the invention, lithography step is required only when defining the first metal layer, the first resist layer, protective layer and the pixel electrode. Consequently, only four lithography steps are required that cost is reduced and process steps can be simple. In addition, since only the reflective region is covered with metal, and the transmissive region is not, a portion of the pixel area can reflect light and another portion can be passed through by light to form a transflective liquid crystal display.

In an embodiment of the invention, the metal for reflecting light can comprise recesses on the surface without additional lithography steps to increase light reflection angle. While in an example, the reflective layer 212 in FIG. 2E can be formed with recesses by the following method, the invention is not limited thereto. The reflective layers for reflecting light in any embodiment of the invention can comprise recesses.

Figure 4A:
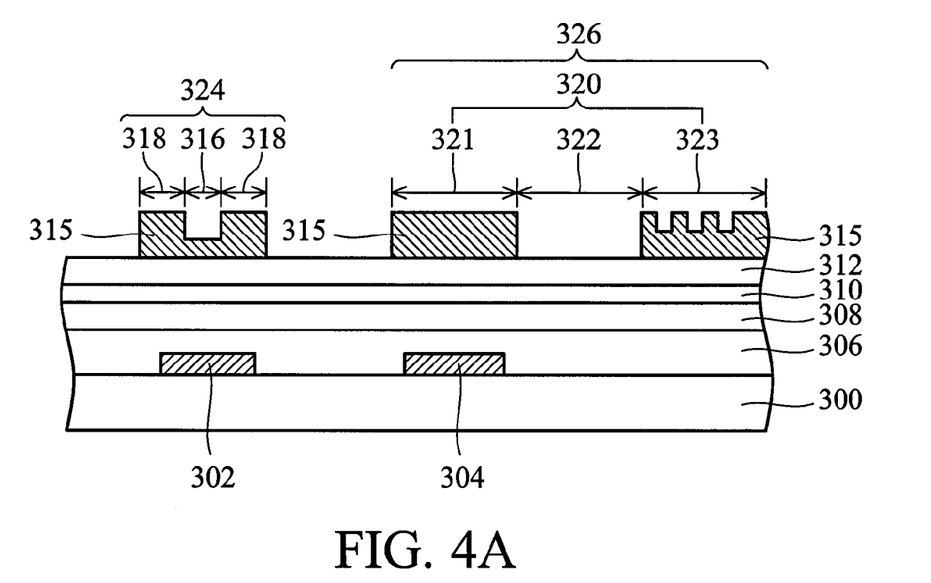
Figure 4B:
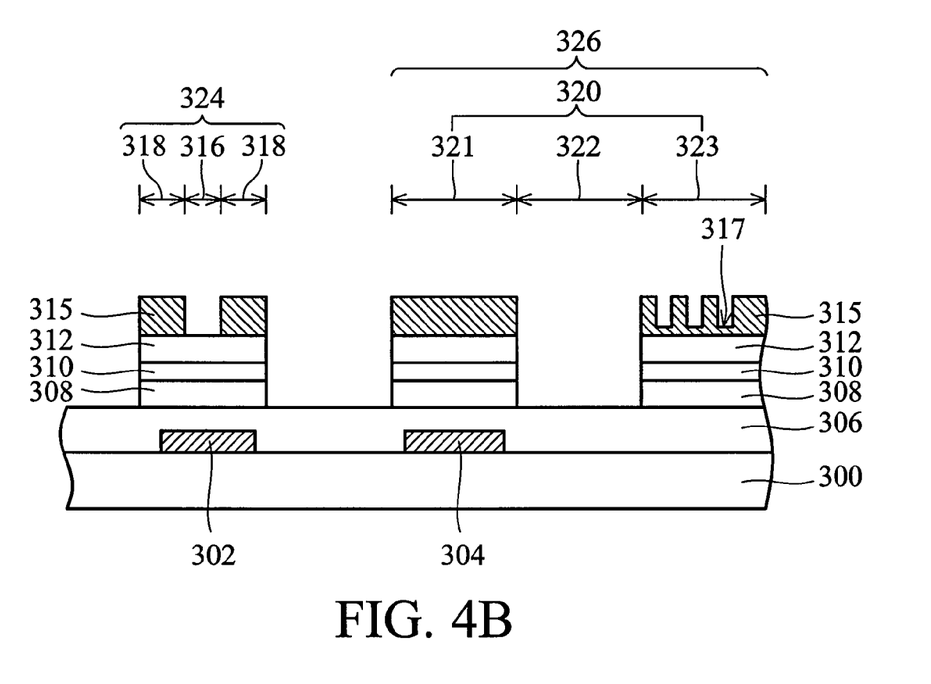
Figure 4C:
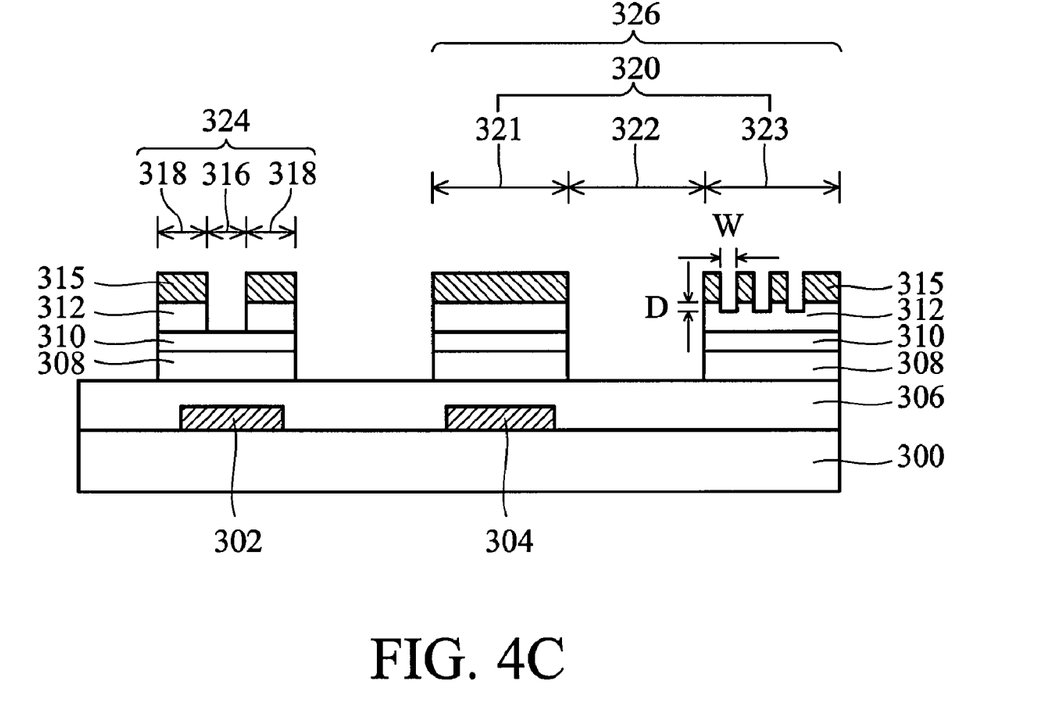
FIG. 4C shows process steps for forming a transflective liquid crystal display comprising a reflective layer with recesses.

FIG. 4A~FIG. 4C shows process steps for forming a transflective liquid crystal display comprising a reflective layer with recesses. The same or similar parts to the embodiment described are not described for simplicity.

As shown in FIG. 4A, a resist layer is coated on the second metal layer 312 and exposed by halftone process to form a first resist layer 315 having. portions of different thicknesses overlying the second metal layer 312 subsequent to developing. In the embodiment of the invention, the first resist layer 315 has portions of different thicknesses overlying the thin film transistor area 324. For example, one portion of the first resist layer 315 overlying the channel region 316 is thinner than another portion of the first resist layer 315 overlying the source/drain region 318. Alternatively, a portion of the pixel area 326 is covered with the first resist layer 315, for example, the contact region 321 and the reflective region 323 are covered with the first resist layer 315, and the transmissive region 322 is not covered with the first resist layer 315. Additionally, the first resist layer 315 overlying the reflective region 323 can be formed with recesses by using halftone exposure technology.

Next, as shown in FIG. 4B, the second metal layer 312, the doped layer 310 and the active layer 308 are etched respectively by using the first resist layer 315 as a mask until the gate dielectric layer 306 uncovered by the first resist layer 315 is revealed. In an embodiment of the invention, the first resist layer 315 overlying the channel region 316 has a thickness formed by controlling the halftone process and the etching process so as to be removed when the abovementioned layers are etched. In another embodiment of the invention, the first resist layer 315 overlying the channel region 316 is further removed by plasma etching, such as comprising O3, subsequent to etching of layers of 312, 310 and 308. Additionally, the uneven resist layer 315 overlying the reflective region 323 is recessed. Specifically in one embodiment of the invention, bottom portions 317 of the recesses of the resist layer 315 are etched, or further the bottom portions 317 are removed to reveal the second metal layer 312 in the recesses.

As shown in FIG. 4C, the second metal layer 312 is etched by using the first resist layer 315 as a mask to remove the second metal layer 312 overlying the channel region 316, and simultaneously transfer the recess structure of the first resist layer 315 to the surface of the second metal layer 312 overlying the reflective region 323 to create a uneven surface. The roughness of the second metal layer 312 surface can be fine tuned according to etching parameters, or density and recess depth of the first resist layer 315. Width W or depth D of the recess structure can be a design choice of product or process. Preferably, D/V is about 1/40~1/10. Finally, the first resist layer 315 is removed.

FIG. 5A~FIG. 5F illustrate process steps for forming a reflective liquid crystal display of further another embodiment of the invention, in which only four lithography steps are required. Similar parts with the embodiment described are not described for simplicity.

Figure 5A:
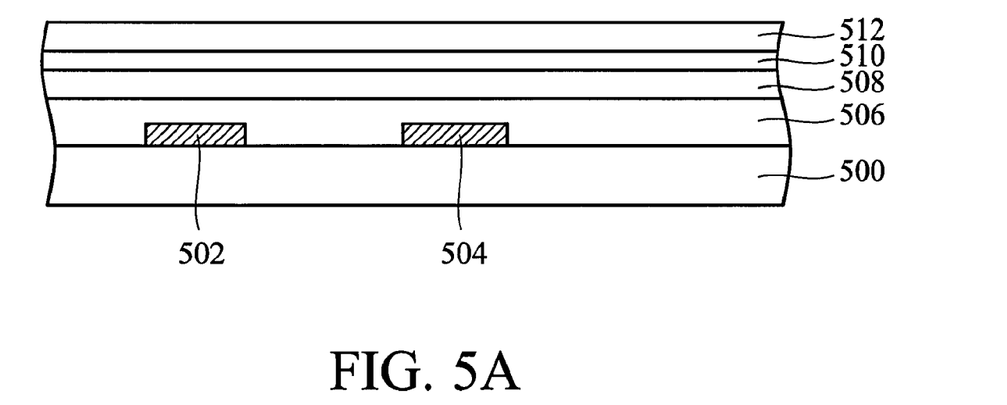
FIG. 5A~FIG. 5F illustrate process steps for forming a reflective liquid crystal display of further another embodiment of the invention.

Referring to FIG. 5A, a substrate 500, such as a glass substrate, a low alkali glass substrate and a non-alkali glass substrate, is provided. Next, a first metal layer (not shown) is formed on the substrate 500 by deposition, such as chemical vapor deposition CVD or plasma vapor deposition PVD. The first metal layer can be a single layer, for example comprising Al, Mo, or alloy AlNd, or multiple layers, such as Ti/Al, TiN/Al, Mo/Al or Ti/AlNd. Preferably, the first metal layer is a stacked layer of Ti/Al/TiN.

The first metal layer is patterned by conventional lithography and etching to form a gate line 502 and a storage capacitor 504 on the substrate 500. Next, a gate dielectric layer 506, an active layer 508, a doped layer 510 and a second metal layer 512 are formed on the substrate 500, the gate line 502 and the storage capacitor 504 in sequence by deposition, such as low pressure chemical vapor deposition LPCVD, plasma enhanced chemical vapor deposition PECVD or atomic layer deposition ALD. The invention, however, is not limited thereto.

Figure 5B:
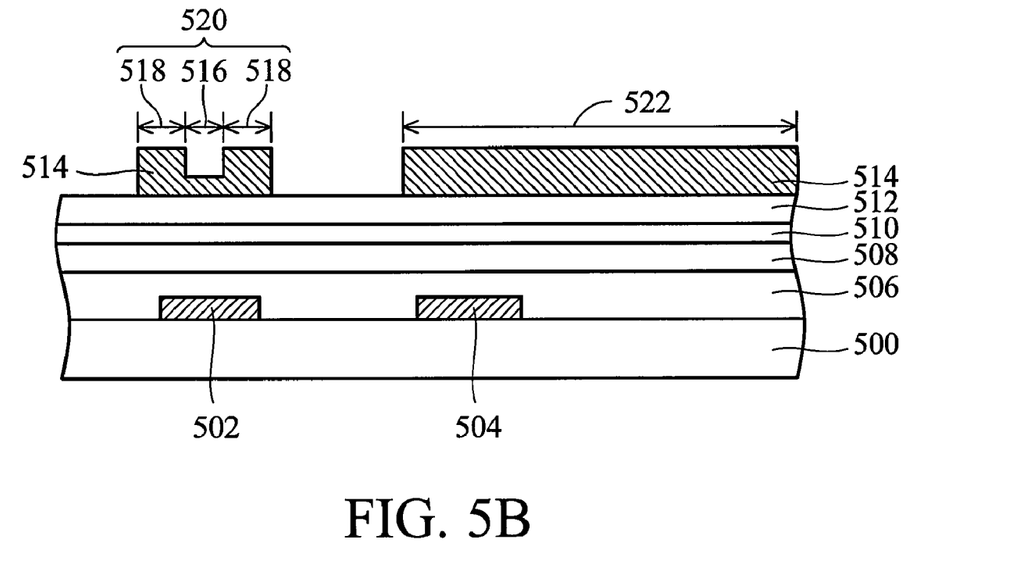

Next, as shown in FIG. 5B, a photoresist layer is coated on the second metal layer 512, then exposed by halftone process to form a first resist layer 514 having portions of different thicknesses subsequent to developing. In the embodiment of the invention, the first resist layer 514 has portions of different thicknesses overlying the thin film transistor area 520. For example, one portion of the first resist layer 514 overlying the channel region 516 is thinner than another portion of the first resist layer 514 overlying the source/drain region 518. Additionally, the first resist layer 514 overlying the pixel area 522 has substantially the same surface level. Preferably, the first resist layer 514 overlying the pixel area 522 and another portion of the first resist layer 514 overlying the source/drain region 518 substantially have the same thickness. In an exemplary example of the invention, the thickness of the first resist layer 514 overlying the pixel area 522 and the source/drain region 518 is about 15000 Å, and the thickness of the first resist layer 514 overlying the channel region 516 is about 4000 Å.

Figure 5C:
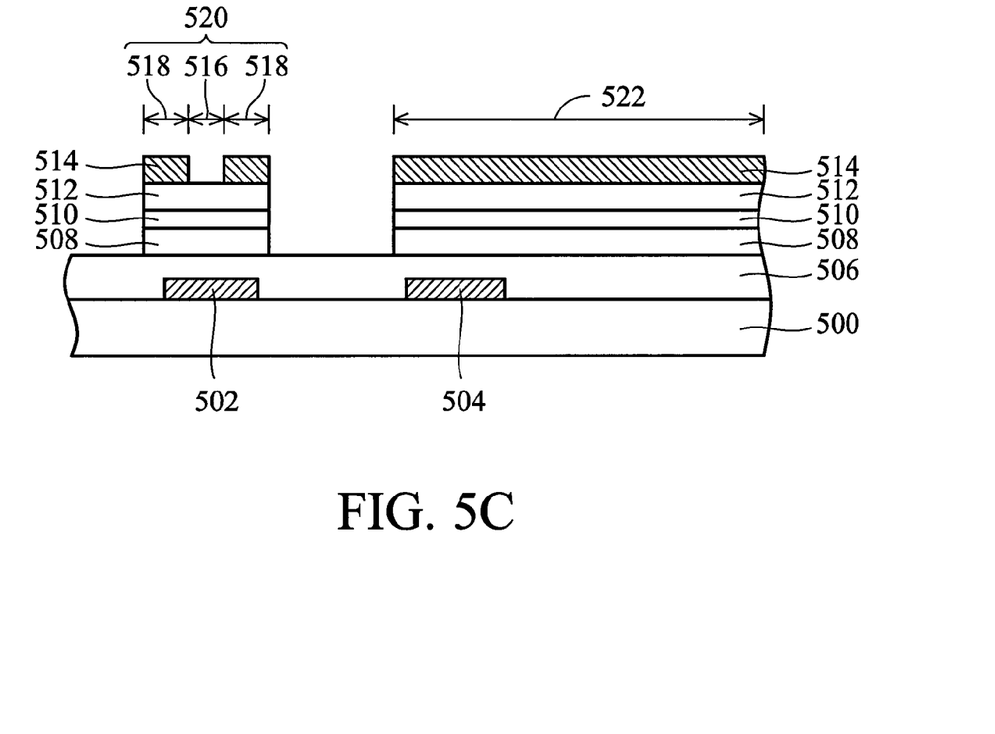
Figure 5D:
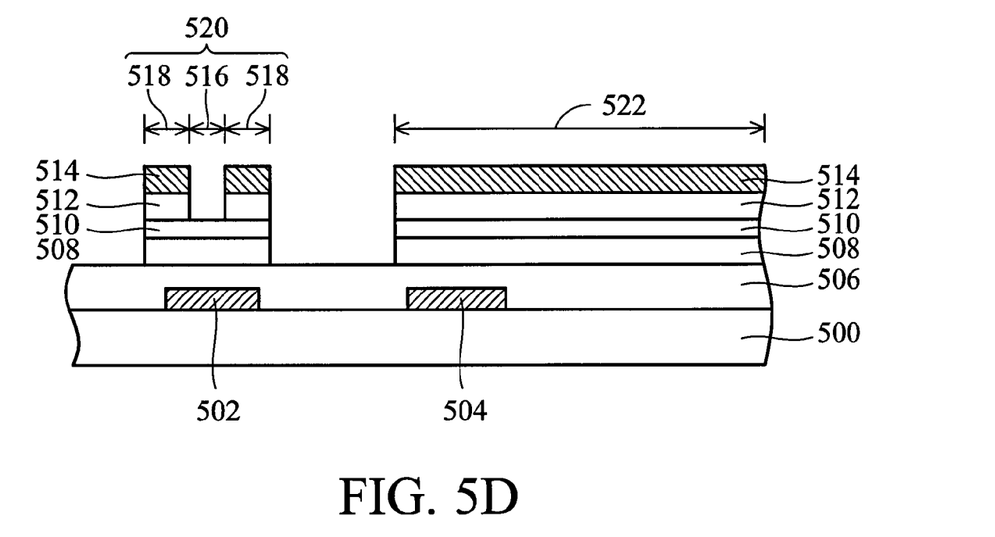
Figure 5E:
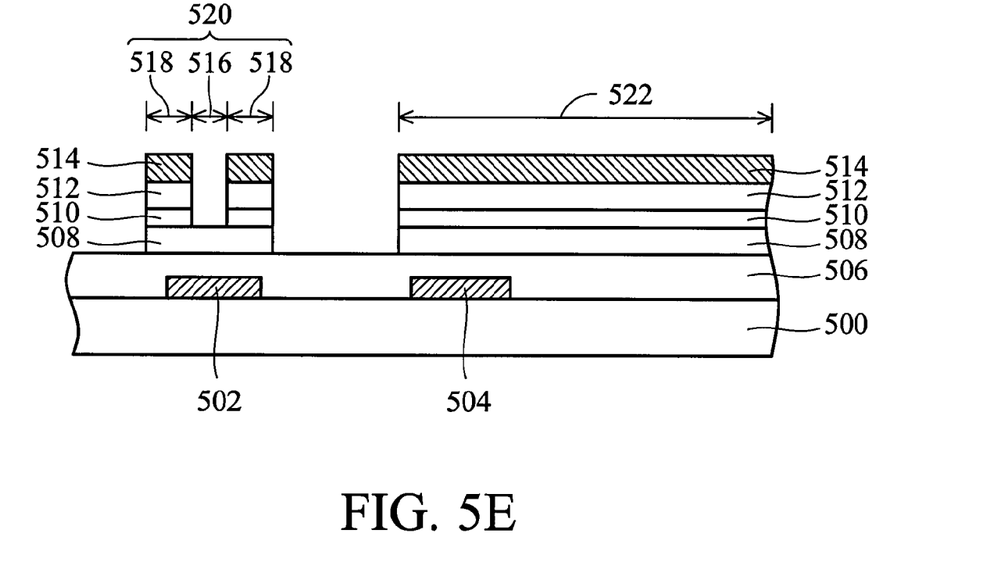
Figure 5F:
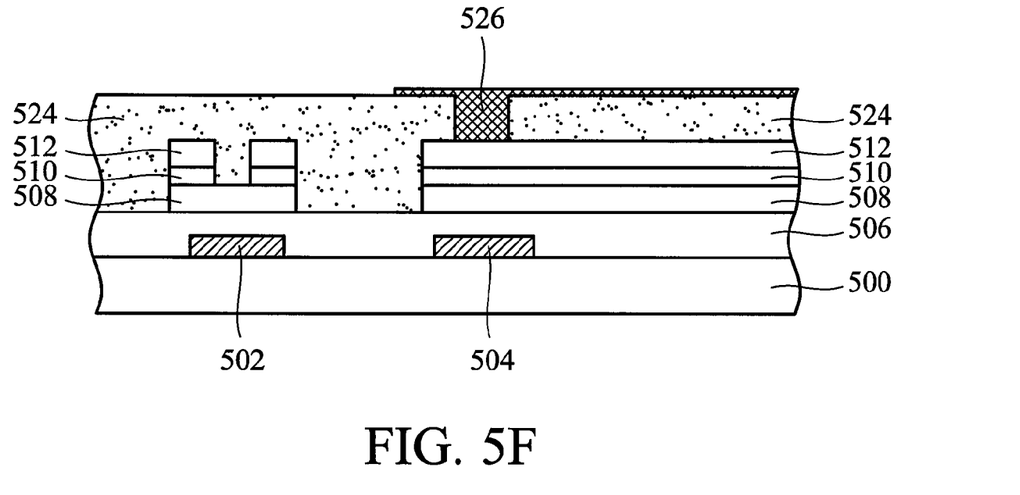

Next, as shown in FIG. 5C, the second metal layer 512, the doped layer 510 and the active layer 508 are etched respectively using the first resist layer 514 as a mask until the gate dielectric layer 506 uncovered by the first resist layer 514 is revealed. In an embodiment of the invention, the first resist layer 514 overlying the channel region 516 has a thickness formed by controlling the halftone process and the etching process so as to be removed when the abovementioned layers are etched. As shown in FIG. 5D, the second metal layer 512 overlying the channel region 516 is etched and removed by using the first resist layer 514 as a mask. Next, as shown in FIG. 5E, the doped layer 510 overlying the channel region 516 is etched by using the first resist layer 514 and the second metal layer 512 as a mask. The first resist layer 514 is then removed. As shown in FIG. 5F, a protective layer 524, such as a TiN layer, is formed by deposition, such as chemical vapor deposition CVD or plasma enhanced chemical vapor deposition PECVD, to cover the gate dielectric layer 506, the etched second metal layer 512 and the active layer 508 described. The protective layer 524 is patterned by conventional lithography and etching to form an opening overlying the contact region. Next, the pixel electrode layer, such as ITO, is formed on the protective layer, and fills the opening to serve as a contact. The pixel electrode layer is patterned by conventional lithography and etching to act as a pixel electrode 526 of a liquid crystal display.

Alternatively, the reflective electrode in the embodiment of the invention can comprise recesses by using the method described. The invention, however, is not limited thereto. In another embodiment of the invention, a plurality of bumps can be formed on the second metal layer overlying the reflective region by lithography and etching.

According to an embodiment of the invention, a reflective layer formed on the inner part of a display panel can eliminate aberration. In addition, the method for forming a transflective TFT LCD or a reflective TFT LCD requires only four lithography steps, reducing cost, process time and steps.

In an embodiment of the invention, the metal for reflecting light can be formed with recesses or bumps on the surface without additional lithography steps, increasing angle of light reflection. In an example, the reflective layer in FIG. 2E can be formed with recesses. The invention, however, is not limited thereto. The recesses and forming method thereof can be used in any embodiment of the invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for forming a liquid crystal display, comprising:
   providing a substrate comprising a thin film transistor area and a pixel area thereon;
   forming a gate line, a gate dielectric layer, an active layer and a doped layer overlying the substrate sequentially;
   forming a metal layer overlying the doped layer;
   defining the metal layer, the doped layer and the active layer in the thin film transistor area to form a thin film transistor; and
   defining the metal layer in the pixel area to form a first metal portion of a first thickness and a second metal portion of a second thickness, wherein the first metal portion acts as a contact region, the first thickness exceeds the second thickness, and the second thickness is sufficient to partially reflect and partially transmit incident light to form a transflective region in the pixel area.

2. The method for forming a liquid crystal display as claimed in claim 1, wherein the substrate is a glass substrate.

3. The method for forming a liquid crystal display as claimed in claim 1, wherein the steps of defining the metal layer, the doped layer and the active layer in the thin film transistor area and defining the metal layer in the pixel area comprise:
   forming a patterned resist layer covering a portion of the metal layer, wherein the resist layer in the thin film transistor area comprises at least two thicknesses, and the resist layer in the pixel area comprises at least two thickness; and
   patterning the metal layer, the doped layer and the active layer using the resist layer as a mask to form a thin film transistor in the thin film transistor area, and to form a transflective region of the metal layer with at least two thickness in the pixel area.

4. The method for forming a liquid crystal display as claimed in claim 3, wherein the first metal portion contacts a pixel electrode, and one portion of the resist layer overlying the transflective region is thinner than another portion overlying the first metal portion.

5. The method for forming a liquid crystal display as claimed in claim 3, wherein the thin film transistor area comprises a channel region and a source/drain region, wherein the steps of forming the thin film transistor and the transflective region comprise:
   patterning the metal layer, the doped layer and the active layer, removing the resist layer overlying the channel region and simultaneously removing a portion of the resist layer overlying the transflective region;
   removing the metal layer overlying the channel region using the resist layer as a mask, and removing the other portion of the resist layer and a portion of the metal layer overlying the transflective region; and
   removing the doped layer overlying the channel region.

6. The method for forming a liquid crystal display as claimed in claim 3, wherein the thin film transistor area comprises a channel region and a source/drain region, and the metal layer comprises a first metal layer and a second metal layer, wherein the steps of forming the thin film transistor and the transflective region comprise:
   patterning the metal layer, the doped layer and the active layer, removing the resist layer overlying the channel region and simultaneously removing a portion of the resist layer overlying the transflective region;
   removing the second metal layer overlying the channel region by wet etching;
   removing the first metal layer overlying the channel region and the other portion of the resist layer overlying the transflective region by dry etching; and
   removing a portion of the second metal layer overlying the transflective region by wet etching.

7. The method for forming a liquid crystal display as claimed in claim 6, wherein the first metal layer comprises Ti, TiN and Mo, and the second metal layer comprises Al and AlNd.

8. The method for forming a liquid crystal display as claimed in claim 6, wherein the first metal layer comprises Ti having a thickness of substantially 50~200 Å.

9. The method for forming a liquid crystal display as claimed in claim 6, wherein the first metal layer comprises TiN having a thickness of substantially 50~200 Å.

10. The method for forming a liquid crystal display as claimed in claim 3, wherein the thin film transistor area comprises a channel region and a source/drain region, and the resist layer overlying the channel region is thinner than the resist layer overlying the transflective region.

11. The method for forming a liquid crystal display as claimed in claim 3, wherein at least one portion of the resist layer overlying the pixel area has a plurality of recesses.

12. A method for forming a liquid crystal display, comprising:
    providing a substrate comprising a thin film transistor area and a pixel area thereon;
    forming a gate line, a gate dielectric layer, a active layer and a doped layer overlying the substrate;
    forming a metal layer overlying the doped layer;
    defining the metal layer, the doped layer and the active layer in the thin film transistor area to form a thin film transistor; and
    defining the metal layer, the doped layer and the active layer in the pixel area to form a first portion of the metal layer, a second portion of the metal layer and a tranmissive region exposing the gate dielectric layer, wherein the first portion of the metal layer acts as a contact region, and a thickness of the second portion of the metal layer is sufficient to reflect incident light to form a reflective region.

13. The method for forming a liquid crystal display as claimed in claim 12, wherein the steps of defining the metal layer, the doped layer and the active layer in the thin film transistor area and defining the metal layer, the doped layer and the active layer in the pixel area comprise:
    forming a pattern resist layer covering a portion of the metal layer, wherein the resist layer in the thin film transistor area comprises at least two thicknesses, and the resist layer in the pixel area exposes a portion of the metal layer; and
    patterning the metal layer, the doped layer and the active layer using the resist layer as a mask to form a thin film transistor on the thin film transistor area, and to form the first portion of the metal layer, the second portion of the metal layer and the tranmissive region exposing the gate dielectric layer.

14. The method for forming a liquid crystal display as claimed in claim 13, wherein the thin film transistor area comprises a channel region and a source/drain region, and a thickness of the resist layer overlying the pixel area is substantially the same as a thickness of the resist layer overlying the source/drain region.

15. The method for forming a liquid crystal display as claimed in claim 13, wherein at least a portion of the resist layer overlying the pixel area has a plurality of recesses.

16. A method for forming a liquid crystal display, comprising:
- providing a substrate comprising a thin film transistor area and a pixel area thereon;
- forming a gate line, a gate dielectric layer, an active layer and a doped layer overlying the substrate sequentially;
- forming a metal layer overlying the doped layer;
- defining the metal layer, the doped layer and the active layer in the thin film transistor area to form a thin film transistor; and
- defining the metal layer in the pixel area, where a thickness of the metal layer is sufficient to reflect incident light to form a reflective region.

17. The method for forming a liquid crystal display as claimed in claim 16, wherein the steps of defining the metal layer, the doped layer and the active area in the thin film transistor area and defining the metal layer in the pixel area comprise:
- forming a resist layer covering a portion of the metal layer, wherein the resist layer in the thin film transistor area comprises at least two thicknesses, and the resist layer in the pixel area has an even surface; and
- patterning the metal layer, the doped layer and the active layer using the resist layer as a mask to form a thin film transistor on the thin film transistor area.

18. The method for forming a liquid crystal display as claimed in claim 17, wherein the thin film transistor area comprises a channel region and a source/drain region, and a thickness of the resist layer overlying the metal layer in the pixel area is substantially the same as a thickness of the resist layer overlying the source/drain region.

19. The method for forming a liquid crystal display as claimed in claim 17, wherein at least a portion of the resist layer overlying the pixel area has a plurality of recesses.

* * * * *